(12) United States Patent
Grimminger

(10) Patent No.: US 11,524,574 B2
(45) Date of Patent: Dec. 13, 2022

(54) AXLE DRIVE

(71) Applicant: Kessler & Co. GmbH & Co. KG, Abtsgmünd (DE)

(72) Inventor: Simon Grimminger, Aalen (DE)

(73) Assignee: KESSLER & CO. GMBH & CO. KG, Abtsgmünd (DE)

( * ) Notice: Subject to any disclaimer, the term of this patent is extended or adjusted under 35 U.S.C. 154(b) by 144 days.

(21) Appl. No.: 17/213,309

(22) Filed: Mar. 26, 2021

(65) Prior Publication Data

US 2022/0314789 A1  Oct. 6, 2022

(30) Foreign Application Priority Data

Apr. 1, 2020 (DE) ..................... 10 2020 109 112.5

(51) Int. Cl.
 *B60K 17/24* (2006.01)
 *B60K 1/00* (2006.01)
 *B60K 7/00* (2006.01)

(52) U.S. Cl.
 CPC ............ *B60K 17/24* (2013.01); *B60K 1/00* (2013.01); *B60K 7/0007* (2013.01); *B60K 2001/001* (2013.01); *B60K 2007/0092* (2013.01)

(58) Field of Classification Search
 CPC ........ B60K 17/24; B60K 1/00; B60K 7/0007; B60K 2001/001; B60K 2007/0092
 See application file for complete search history.

(56) References Cited

U.S. PATENT DOCUMENTS

| | | | |
|---|---|---|---|
| 6,732,827 B2 | 5/2004 | San Miguel | |
| 8,424,625 B2 | 4/2013 | Ishii | |
| 11,441,644 B2* | 9/2022 | Ghatti | F16H 3/089 |
| 2013/0087400 A1* | 4/2013 | Fuechtner | B60K 6/40 180/65.23 |
| 2018/0297401 A1 | 10/2018 | Liu et al. | |
| 2020/0124168 A1* | 4/2020 | Ohlig | F16H 63/3466 |
| 2021/0291646 A1* | 9/2021 | Lorenz | B60K 23/04 |
| 2022/0065334 A1* | 3/2022 | Martin | B60K 17/08 |

FOREIGN PATENT DOCUMENTS

| | | |
|---|---|---|
| DE | 10049197 A1 | 4/2002 |
| DE | 102005008525 A1 | 9/2005 |
| DE | 102010061217 A1 | 6/2012 |
| EP | 3446906 A1 | 2/2019 |

OTHER PUBLICATIONS

Ermittellter Stand der Technik; Erläuterungen, Fundstelle; Seite 2 von 13; 1 page; No English Abstract Available.

* cited by examiner

*Primary Examiner* — Erez Gurari
(74) *Attorney, Agent, or Firm* — Dickinson Wright PLLC

(57) ABSTRACT

An axle drive for a vehicle comprising at least one drivable vehicle axle oriented transversely to a longitudinal direction of the vehicle, said axle drive comprising an electric motor; a drive shaft that extends in parallel with the longitudinal direction between a first end and a second end and that is configured to receive drive power from the electric motor at an input section and to output said drive power at least partly to the vehicle axle via a bevel gear arranged at the first end; and a brake, in particular a parking brake, comprising a brake disk that is arranged at a brake section of the drive shaft, wherein the electric motor is arranged coaxially to the drive shaft and the input section of the drive shaft is arranged between the brake disk and the first end with respect to the longitudinal direction.

19 Claims, 9 Drawing Sheets

AXLE DRIVE

CROSS-REFERENCE TO RELATED APPLICATION

Figure 1:
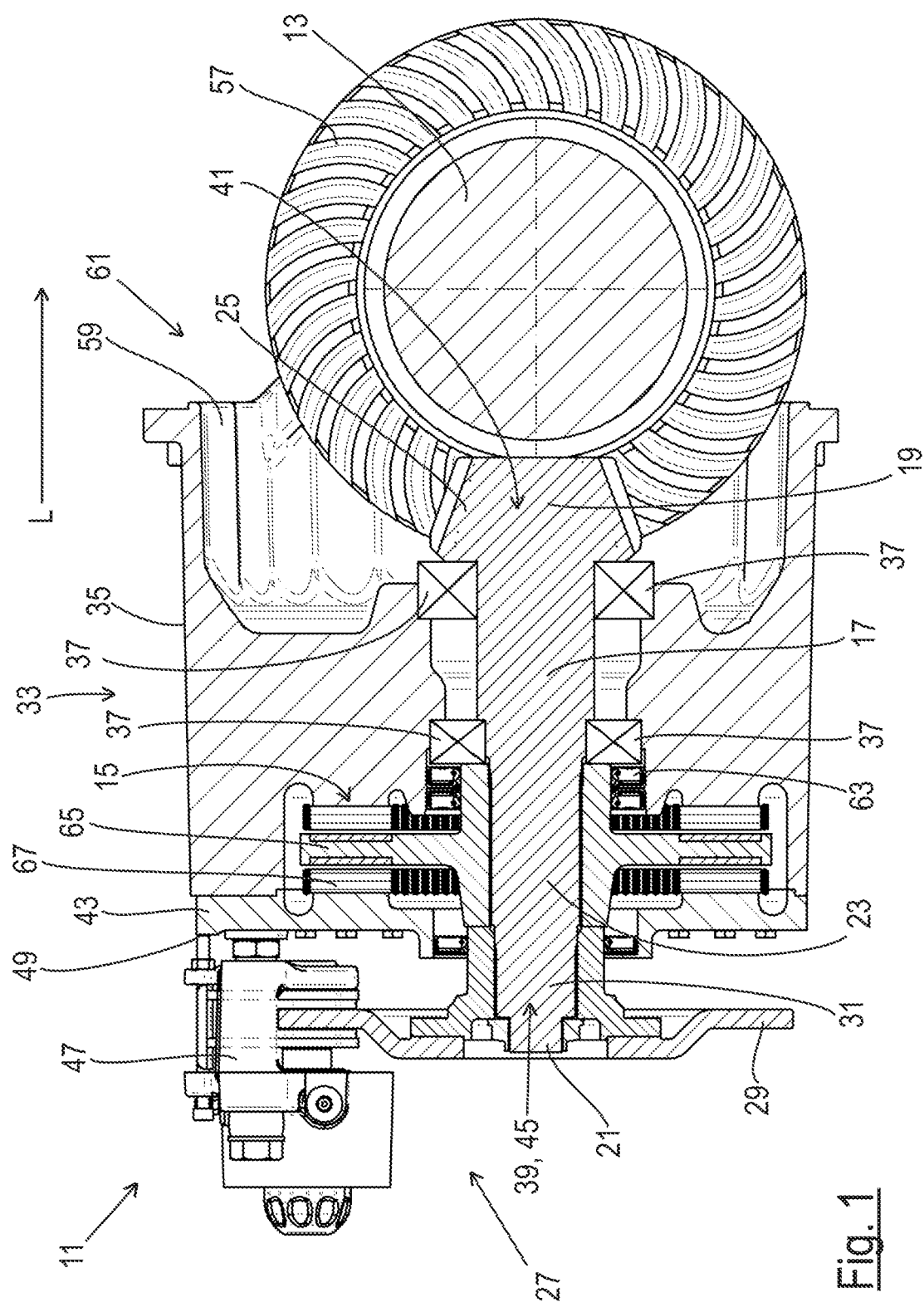

This application claims priority to German Patent Application No. 10 2020 109 112.5 filed on Apr. 1, 2020, the entire contents of which are incorporated herein by reference.

The invention relates to an axle drive for a vehicle comprising at least one drivable vehicle axle oriented transversely to a longitudinal direction of the vehicle.

Such an axle drive may generally serve to transmit drive power generated by a motor, and in particular by an electric motor, to the vehicle axle in order to set the vehicle in motion. While an axle drive may thus primarily be provided for driving the vehicle, it is frequently also necessary to be able to reliably bring the vehicle to a standstill and secure it against rolling away. To achieve this, vehicles may be equipped with a brake that provides a parking brake function.

In some vehicle types, it is possible to implement a sufficient parking brake function via the service brake (operating brake) to secure the vehicle against rolling away. In other vehicles, in which a brake is exposed to higher loads when stationary, such a solution is usually not possible, however. For example, in commercial vehicles e.g. trucks, fork-lift trucks or dump trucks, heavy-duty brakes may be necessary to reliably prevent a movement or a rolling away of the vehicle, in particular during a loading.

It is generally possible to provide a brake at the axle drive to be able to reliably block a rotation of the vehicle axle and provide a parking brake function. Such a brake may in particular also perform an emergency braking function in addition to the typical service brakes of the vehicle, for example, when it closes automatically on a drop in operating pressure.

However, only a very limited installation space, which is at least largely already taken up by components of the axle drive for transmitting drive power to the vehicle axle, is usually available for the axle drive that may in particular be arranged at a lower side of the vehicle. Brakes having a parking brake function may comprise brake disks that frequently have to have a relatively large extent or a large diameter to be able to develop a sufficient braking effect for stopping the vehicle, in particular in the case of heavy vehicles, for example commercial vehicles that are loaded or to be loaded. However, the associated increase of the axle drive may make the installation of an axle drive comprising a brake difficult or preclude it due to the limited installation space in the region of the vehicle axle. In addition, electric motors are increasingly used for driving vehicles and may, for example, be flanged to the axle drive, but in so doing also take up some of the anyway limited installation space in the region of the axle drive and further restrict the possibilities for attaching additional components.

Due to the limited installation space and the taking up thereof by the components for transmitting drive power to the vehicle axle, in particular also by an electric motor, it is consequently difficult to accommodate a brake having a parking brake function at or in the axle drive. The provision of a reliable parking brake function is nevertheless an absolute requirement for numerous vehicles.

It is therefore an object of the invention to provide an axle drive that is drivable by means of an electric motor, that has a design which is as compact as possible, and that enables a design with a brake having a parking brake function.

This object is satisfied by an axle drive having the features of claim 1 and in particular in that the axle drive comprises an electric motor; a drive shaft that extends in parallel with the longitudinal direction of the vehicle between a first end and a second end opposite thereto and that is configured to receive drive power from the electric motor at an input section and to output said drive power at least partly to the vehicle axle via a bevel gear arranged at the first end; and a brake, in particular a parking brake, comprising a brake disk that is arranged at a brake section of the drive shaft, wherein the electric motor is arranged coaxially to the drive shaft, and wherein the input section of the drive shaft is arranged between the brake disk and the first end with respect to the longitudinal direction of the vehicle.

The axle drive thus has a drive shaft which extends in parallel with the longitudinal direction of the vehicle and to which drive power may be transmitted from the electric motor and may be output at the first end of said drive shaft to the vehicle axle via a bevel gear. In contrast to common solutions, the electric motor is, however, not flanged to the axle drive as an external module to transmit drive power to an end section of the drive shaft, but the drive shaft is so-to-say guided through the electric motor such that the brake disk may be arranged at a brake section projecting from the electric motor towards the second end of the drive shaft. In this respect, the electric motor, which is arranged coaxially to the drive shaft, may extend around the drive shaft and may thereby be highly integrated into the axle drive in order to enable a compact design thereof. The electric motor may thus in particular be arranged between the brake disk and the first end of the driven shaft or the bevel gear with respect to the longitudinal direction of the vehicle.

The brake may in particular act as a parking brake and may be provided to reliably secure the vehicle against rolling away when stationary. For this purpose, the brake may, for example, have a brake caliper that engages around the brake disk and that may be configured for holding the brake disk when the vehicle is stationary in order to block a rotation of the brake disk, of the drive shaft connected thereto, and thus also of the vehicle axle coupled to the drive shaft via the bevel gear. The brake caliper may in this respect in particular engage at a section of the brake disk that is a radially outer section with respect to the drive shaft to be able to apply as large a braking torque as possible or to be able to compensate as large a torque as possible conducted via the vehicle axle to the drive shaft.

Alternatively or additionally to such a brake serving as a parking brake, provision may also be made to equip the axle drive with an emergency braking function by way of the brake. For example, a brake caliper may be able to be actively brought out of engagement with the brake disk during a driving with the vehicle in order to enable a rotation of the brake disk together with the drive shaft, while, on the absence of the required action or of a signal necessary therefor, the brake caliper may automatically come into engagement with the brake disk to brake the vehicle.

For this purpose, the brake caliper may in particular comprise a piston that may be or is acted on by pressure during the travel, wherein the brake caliper may automatically come into engagement with the brake disk on the absence of the pressure acting on the piston. On a possible failure of a vehicle system or of a motor providing energy for generating the pressure, for example of the electric motor for driving the vehicle axle, an engagement of the brake caliper into the brake disk and a braking of the vehicle resulting therefrom may thereby be automatically achieved so that the vehicle may be reliably secured against such failures and quickly brought to a standstill in emergency situations. Such a brake provided as an emergency brake may generally also be used or understood as a parking brake in that the action for releasing the brake caliper may in particular also be deliberately omitted when the vehicle is stationary in order to secure the vehicle against rolling away in the sense of a parking brake.

Furthermore, since the input section of the drive shaft is arranged between the brake section and the first end of the drive shaft with respect to the longitudinal direction, at which first end a transmission of the drive power to the vehicle axle via the bevel gear takes place, the brake disk and the electric motor may be arranged at one side of the vehicle axle, while the other side of the vehicle axle may remain free of these components. Thus, depending on the application and installation of the axle drive, a region between the drivable vehicle axle and a further vehicle axle may, for example, remain free and the axle drive may, for example, be arranged in front of a front axle or behind a rear axle of the vehicle. Alternatively thereto, the axle drive may be arranged between two vehicle axles to keep the region in front of a front axle or behind a rear axle free.

This makes it possible to arrange the axle drive flexibly, while taking into account a respective available installation space or a space to be kept free in the region of the vehicle axle. For example, in an articulated joint vehicle, provision may be made to keep the space between two vehicle axles free to enable large articulation angles and driving through tight bends. In this respect, the axle drive may, for example, be arranged completely in front of a front axle or behind a rear axle of such a vehicle such that only the articulated joint may be arranged in the space between the vehicle axles and large articulation angles are also not impaired or blocked by an axle drive arranged between the vehicle axles. At the same time, however, the compact design of the axle drive makes it possible to equip it with a reliable parking brake function.

The brake disk may in particular be directly connected to the brake section of the drive shaft, wherein an indirect coupling, for example via a holder, is also generally possible. In both cases, the brake disk may, however, in particular be rotationally fixedly connected to the brake section and may accordingly rotate at the same rotational speed as the brake section of the drive shaft during operation.

The brake section may be formed by the second end of the drive shaft such that the brake disk may be arranged at the second end and the drive shaft may extend between the brake disk and the bevel gear. Accordingly, the electric motor may be arranged between the brake disk and the bevel gear, said electric motor transmitting the drive power to the input section of the drive shaft such that the input section may form a central section of the drive shaft or a section disposed between the first end and the second end of the drive shaft with respect to the longitudinal direction of the vehicle.

It is, however, generally also possible that the drive shaft extends beyond the brake section to be able to drive a further vehicle axle by means of the axle drive, for example. The drive shaft may in this respect accordingly act a through drive shaft and may, for example, have a further bevel gear at the second end to be able to transmit drive power generated by the electric motor partly to the drivable vehicle axle and partly to a further drivable vehicle axle. In this case, the brake section of the drive shaft at which the brake disk is arranged may thus also be arranged between the second end of the drive shaft and the input section of the drive shaft.

In this respect, the electric motor may, however, also be arranged between the brake section or the brake disk and the first end of the drive shaft or the bevel gear for transmitting drive power to the vehicle axle. In this respect, only the drive shaft may extend between the brake section or the brake disk and a further bevel gear arranged at the second end of the drive shaft, while all further components of the axle drive, apart from any components for distributing the drive power to the further vehicle axle, may be arranged between the brake disk and the first end of the drive shaft.

Further embodiments can be seen from the dependent claims, from the description, and from the drawings.

In some embodiments, the electric motor may extend around the drive shaft, in particular around the input section of the drive shaft. In this respect, the electric motor may comprise a stator and a rotor, wherein the rotor may in particular be rotationally fixedly coupled to the input section of the drive shaft such that the drive shaft may be set into a rotation at a rotational speed corresponding to the rotational speed of the rotor. In this respect, provision may, for example, be made to provide one or more speed reduction stages in the axle drive itself or in a drive train of the vehicle to be able to transmit the rotation of a fast-rotating electric motor reduced or slowed down to the vehicle axle or to wheels arranged at the ends of the vehicle axle and to be able to apply the necessary torques for driving the vehicle. For example, the vehicle axle may be configured as an outer planetary axle for this purpose and may have reduction gear units, in particular planetary gear sets, integrated into the wheel sides of the driven vehicle axle. Due to such speed reduction stages, very compact and fast-rotating electric motors may in particular also be used to generate the drive power in order to limit the extent of the axle drive as much as possible.

In some embodiments, the axle drive may further comprise a housing in which the drive shaft is received, wherein the input section of the drive shaft is arranged within the housing.

In particular, the drive shaft may in this respect be at least partly received in the housing and may extend from the housing. For example, the brake section of the drive shaft may extend from the housing such that the brake disk may also be arranged outside the housing. Due to such a leading of the drive shaft from the housing, the brake may be designed as a dry brake and may be easily accessible in order, for example, to be able to quickly and easily replace a worn brake disk or carry out other service work at the brake. Furthermore, the design of the brake with a dry rotating brake disk makes it possible to achieve higher efficiencies in comparison with wet-running multi-disk brakes, in particular multi-disk parking brakes. Provision may likewise be made that the bevel gear, via which the drive power is transmitted to the vehicle axle, projects from the housing or is arranged outside the housing to be able to lead drive power from the axle drive and transmit it to the vehicle axle. In this respect, the first end of the drive shaft may also extend from the housing.

The housing may have a bearing section which is integrally formed in one part and at which bearings for supporting the drive shaft are supported. All the bearings for supporting the drive shaft may in this respect in particular be supported at the bearing section. Since the bearing section may be integrally formed in one part and may be formed as a single materially bonded part, the bearings for supporting the drive shaft may be oriented exactly in alignment with one another and any production tolerances that occur on the connection of two parts for supporting the drive shaft may be avoided. An exact alignment of the drive shaft along or in parallel with the longitudinal direction of the vehicle may thereby also be achieved, in particular to be able to ensure a precise alignment and a reliable support of the drive shaft on the use of a fast-rotating electric motor and at correspondingly high rotational speeds of the drive shaft. The bearings may in this respect in particular be configured as rolling element bearings.

To be able to support all the bearings of the drive shaft at such a bearing section formed integrally in one part, the brake disk may in particular be arranged at the second end of the drive shaft such that the drive shaft only extends between the brake disk and the bevel gear. In this respect, the drive shaft may consequently be compact and may be sufficiently supported by the bearing section. If, in contrast, the drive shaft extends beyond the brake section in order, for example, to drive a further vehicle axle by means of a further bevel gear arranged at the second end, the drive shaft may also be supported at further points to reliably support and align the drive shaft that is then longer. However, an alignment of the drive shaft in parallel with the longitudinal direction of the vehicle that is as free of strain as possible may in this respect also be achieved by the support at the bearing section that is integrally formed in one part.

The electric motor may be arranged within the housing. The electric motor may in particular be arranged within said bearing section. Consequently, the electric motor may be protected by the housing against external influences or damage, whereas the brake section of the drive shaft may extend from the housing to be able to arrange the brake disk outside the housing and to be able to design the brake as a dry brake. The housing may thus surround a core of the axle drive to be able to connect the axle drive as a compact unit, for example to an axle housing, in the course of an installation. In addition to the brake section or the second end of the drive shaft, the first end of the drive shaft may, however, in particular also project from the housing to engage into an axle chamber by means of the bevel gear and to be able to drive the vehicle axle.

In some embodiments, the housing may have an installation opening through which the electric motor may be introduced into the housing in an axial manner with respect to the drive shaft. The electric motor may in particular be able to be introduced into said bearing section through the installation opening such that the bearing section may have the installation opening. In other words, the installation opening is formed such that the electric motor may be introduced into the housing through the installation opening.

Furthermore, the housing and in particular the bearing section may have a drive transmission opening that is opposite the installation opening with respect to the longitudinal direction of the vehicle. In this respect, the bevel gear for driving the vehicle axle may project from the housing or the bearing section through the drive transmission opening. In particular in a one-part design of the drive shaft and the bevel gear, provision may be made to insert the drive shaft axially into the housing through the drive transmission opening opposite the installation opening and to connect said drive shaft to the electric motor introduced through the installation opening such that the electric motor extends around the input section of the drive shaft. The electric motor may be introduced first and then the drive shaft may be introduced or a reverse order may be provided. The drive shaft may in this respect in particular be dimensioned such that the drive shaft extends beyond the electric motor and the brake section of the drive shaft extends from the installation opening such that the brake disk may be or is attached outside the housing. The axial insertion of the drive shaft and the electric motor may in particular enable an installation to be carried out in a simple and fast manner.

This insertion of the drive shaft through the drive transmission opening may generally also be provided if the drive shaft and the bevel gear are formed in two parts. The bevel gear may in this respect in particular be connected to the drive shaft before the insertion of the drive shaft into the housing.

Alternatively thereto, provision may also be made that both the electric motor and the drive shaft are insertable into the housing through the installation opening in an axial manner with respect to the drive shaft. For example, the electric motor may be inserted into the housing through the installation opening and the drive shaft may thereupon be inserted axially into the housing through the installation opening, wherein the drive shaft may be oriented coaxially to the electric motor by bearings supported at the bearing section. In this respect, the drive shaft may be inserted such that the electric motor extends coaxially around the input section of the drive shaft. Likewise, a reverse order may be provided by first introducing the drive shaft and then orienting the electric motor coaxially to the drive shaft and inserting said electric motor into the housing around the input section of the drive shaft. For example, the bevel gear may thereupon be connected to the first end of the drive shaft projecting through a drive transmission opening.

In some embodiments, the housing may further comprise a cover for the installation opening. The cover may in particular be attachable to said bearing section. After the introduction of the drive shaft and of the electric motor, the housing may consequently be closed to protect the components arranged within the housing from damage during the operation of the axle drive. The cover may in this respect in particular have an opening through which the second end of the drive shaft projects from the housing. The brake section of the drive shaft may thereby also be arranged outside the housing such that the brake disk may be connected to the drive shaft or the brake section outside the housing.

Furthermore, a stator of the electric motor may in particular be rotationally fixedly connected to the housing, for example to said bearing section and/or to said cover. In this way, the stator may be reliably supported at the housing in a stationary manner.

In some embodiments, the brake disk may be arranged outside the housing. In particular, the brake disk may thereby run dry and the parking brake may be designed as a dry brake. Furthermore, the brake disk may thus be accessible from the outside in a simple manner in order, for example to be able to carry out service work at the brake without having to open or dismantle the housing. The change of a worn brake disk may thereby also be facilitated. The brake disk may in this respect in particular be arranged at the second end of the drive shaft such that the axle drive may form a compact unit for driving the vehicle axle that extends from the brake disk to the bevel gear or to a ring gear meshing with the bevel gear.

In some embodiments, the brake may comprise a brake caliper that is fastened to an outer side of the housing. The brake caliper may serve to engage around a brake disk arranged outside the housing and to block it if necessary in order to be able to achieve a reliable standstill of the vehicle. The brake caliper may also be accessible from the outside in a simple manner due to the arrangement at an outer side of the housing such that the total brake may, for example, be serviced without having to open the housing.

Furthermore, the brake caliper may be connected to the housing such that the brake caliper is arranged vertically above the brake disk in the installed state or in the state of the axle drive connected to the vehicle axle such that the brake disk may, for example, be removed and replaced from below or from a lower side of the vehicle. The brake caliper may in this respect in particular be arranged perpendicular above the drive shaft. Alternatively thereto, the brake caliper may, however, also be attached laterally and rotated by up to 90°, preferably by up to 45°, in comparison with an arrangement that is perpendicular with respect to the drive shaft. Any desired arrangements of the brake caliper around the brake disk and in particular also below the brake disk or the drive shaft are generally possible, wherein arrangements that enable a removal of the brake disk downwardly or from below may facilitate service or repair work.

Provision may be made that the brake caliper is floatingly supported at the housing. Slight axial movements or extensions of the brake disk during the operation of the axle drive for driving the vehicle may thereby be made possible without the brake caliper blocking a rotation of the brake disk rotating together with the drive shaft.

The brake caliper may in particular be fastened to said cover for the installation opening of the housing. Thus, the drive shaft and the electric motor may first be introduced into the housing, in particular through the installation opening, and arranged there, whereupon the housing may be closed by the cover and the brake may be installed. The brake caliper may in this respect engage around the brake disk to be able to fixedly hold the brake disk when the vehicle is at a standstill and thereby to be able to prevent a rolling away of the vehicle. The brake may in this respect in particular comprise a single brake disk. Accordingly, the brake may also comprise a single brake caliper such that the brake may be formed with a small number of components and the axle drive may thereby be compact. Furthermore, the brake disk may be designed as running dry and the brake may thus be designed as a dry, low-wear and low-maintenance brake with a high degree of efficiency.

In some embodiments, the axle drive may furthermore comprise a differential for distributing at least a respective portion of the drive power to two half-shafts of the vehicle axle, wherein a ring gear meshing with the bevel gear may be rotationally fixedly coupled to the differential. In particular, the ring gear may in this respect be rotationally fixedly connected to a differential cage of the differential or may be formed in one part with such a differential cage. Accordingly, the differential may be configured as a cone differential. Such a differential may in particular serve to transmit the drive power generated by the electric motor to two respective half-shafts of the vehicle axle as required in order, for example, to enable a faster rotation of a wheel rotating at the outside on a driving through of a bend with the vehicle.

The differential may be received in a differential housing, wherein the differential housing and the housing in which the drive shaft is received may form a common lubricant chamber for the differential and the bearings of the drive shaft. In this respect, the electric motor may be sealed with respect to the common lubricant chamber. Since the housing, in particular said bearing section, and the differential housing may form a common lubricant chamber, the radiation surface for waste heat generated by the drive shaft during the rotation may be increased. In particular on the use of a fast-rotating electric motor, by which the drive shaft may also be set into a fast rotation, an overheating of the axle drive may thus be prevented. Furthermore, due to the sealing of the lubricant chamber towards the electric motor, the brake section of the drive shaft may also be sealed with respect to a lubricant used such that the brake disk arranged thereat may rotate dry.

Alternatively to a design with a differential, the axle drive may comprise at least one half-shaft of the vehicle axle, wherein the ring gear may be rotationally fixedly coupled to the half-shaft. Drive power generated by the electric motor and transmitted via the drive shaft may consequently be conducted directly to the respective half-shaft of the vehicle axle. In such embodiments, a second axle drive may in particular be provided for individually driving the second half-shaft of the vehicle axle, wherein both half-shafts of the vehicle axle may also in this respect be driven as required by controlling the respective electric motors in order, for example, to facilitate the driving through of a bend.

In some embodiments, the electric motor may have a rotor that is rotationally fixedly connected to the input section of the drive shaft. In such embodiments, the input section of the drive shaft or the drive shaft may rotate in accordance with the rotational speed of the rotor. This may enable a very compact design of the axle drive in that the drive power generated by the electric motor is directly, without any intermediate elements, transmitted to the input section of the drive shaft and transferred.

Alternatively thereto, the electric motor may in some embodiments have a rotor and a transmission via which the rotor is connected to the input section of the drive shaft to transmit drive power received from the electric motor to the input section of the drive shaft. Such a transmission may in this respect in particular be configured as a reduction gear unit by which the rotational speed of the rotor may be transmitted reduced or slowed down to the input section of the drive shaft. In particular on the use of such a fast-rotating and compact electric motor, such a speed reduction of the rotational speed may be provided in order, due to the slowed-down rotation of the drive shaft, to be able to reduce the waste heat generated by the drive shaft during the operation and to apply the required torques for driving the vehicle axle with a compact electric motor, for example.

The transmission may be configured to transmit drive power generated by the electric motor to the input section of the drive shaft via at least one transmission stage. As mentioned, a speed reduction or a slowing down of the rotational speed may in this respect in particular be provided. Such a transmission may generally also have a plurality of stages or gears, wherein provision may, for example, be made that only a transfer of the rotational speed of the rotor to the input section of the drive shaft takes place in one of the stages.

The transmission may be arranged coaxially to the drive shaft. The transmission may thereby be integrated as compactly as possible into the axle drive.

The transmission may be arranged in the already mentioned bearing section of the housing of the axle drive or the transmission may be arranged in a transmission housing section that is connectable to the bearing section and that may in particular form said cover for the installation opening. The transmission may thus be connectable to the electric motor and to the input section of the drive shaft during the installation.

The transmission may in particular be configured as a planetary gear set.

The transmission may further be configured to transmit drive power, which is transmitted from the electric motor to an intermediate shaft, selectively via a first transmission stage or a second transmission stage to the input section of the drive shaft, wherein more than two transmission stages may also be provided between whom a selection may be made. The transmission may thus be shiftable. In such a transmission, a ratio of the rotational speeds between a rotor of the electric motor and the input section of the drive shaft equal to one may generally also be provided in at least one of the transmission stages such that only a transfer of the rotational speed of the rotor to the drive shaft takes place in this transmission stage.

The transmission may be configured as a planetary gear set that has a sun gear, a plurality of planet gears and a fixedly held ring gear, wherein the planet gears are configured to rotate around respective axles that are arranged on a web rotatable around the sun gear, wherein the drive shaft may be rotationally fixedly connected to the web, and wherein a rotor of the electric motor may be rotationally fixedly connected, in particular selectively rotationally fixedly connectable, to the sun gear or the web. Consequently, the input section of the drive shaft may be rotationally fixedly connected to the web and may rotate at the rotational speed of the web, with a speed reduction in the rotational speed taking place on a coupling of the rotor to the sun gear, while the rotational speed of the rotor is transmitted unchanged to the input section of the drive shaft when the rotor is rotationally fixedly connected to the web. The coupling of the rotor may in this respect in particular be selectable such that the transmission may be designed as shiftable. For this purpose, a switchable coupling may in particular be provided for selectively connecting the rotor to the web or to the sun gear, wherein the coupling may in particular be designed as a dog clutch. Furthermore, due to the coupling, a coupling of the input section of the drive shaft to the web or to the sun gear may be selectable, while the rotor of the electric motor may, for example, be permanently connected to the sun gear.

Furthermore, the transmission may be configured as a planetary gear set having a fixedly held web, wherein the drive shaft may be rotationally fixedly connected to a ring gear. In this respect, a rotor of the electric motor may be rotationally fixedly connected and/or connectable to a sun gear of the planetary gear set. Such a transmission may also in particular be shiftable since the rotor may, for example, be selectively connected or connectable to the sun gear or the ring gear. In this respect, a rotational speed of the rotor may be transmitted reduced or slowed down to the drive shaft by coupling said rotor to the sun gear, while the rotational speed of the rotor may be transmitted unchanged to the drive shaft on a coupling to the ring gear.

In some embodiments, provision may also be made that the rotor of the electric motor is connected to the input section of the drive shaft via a plurality of transmissions, in particular at least two transmissions, connected after one another. These plurality of transmissions may in particular be configured as planetary gear sets. The input section of the drive shaft may be coupled to an output of one of the transmissions, wherein a rotational speed of the rotor may be transmitted reduced to the input section by the plurality of transmissions. A speed reduction or a slowing down may in this respect in particular be provided.

Furthermore, at least one transmission, a plurality of transmissions, or all of the plurality of transmissions may be shiftable to be able to choose between different transmission stages with respect to the rotational speed transmitted from the rotor to the input section. In this respect, provision may also be made to be able to transmit the rotational speed of the rotor unchanged to the input section of the input shaft by setting one of the transmission ratios.

In some embodiments, the drive shaft may be configured to output drive power received at the input section at least partly to a further drivable vehicle axle via the second end or via a further bevel gear arranged at the second end. The drive shaft may in this respect in particular also be formed in multiple parts and may, for example, be configured as an articulated shaft, in order, for example, to enable a deflection of the two driven vehicle axles with respect to one another. The brake section at which the brake disk is arranged may in this respect consequently be arranged between the second end and the input section.

The further bevel gear arranged at the second end may in particular mesh with a further ring gear, wherein the further ring gear may be rotationally fixedly connected to a further differential, in particular to a differential cage of the further differential, for distributing at least a respective portion of the drive power to two half-shafts of the further vehicle axle. The half-shafts of the further vehicle axle may thus also be driven as required.

In some embodiments, the drive shaft may comprise at least a first part shaft and a second part shaft coaxial thereto as well as a longitudinal differential that is arranged therebetween and that is configured to receive drive power from the electric motor at an input element and to distribute it to the first part shaft and the second part shaft via two output elements.

In this respect, the first part shaft may in particular have said first end of the drive shaft at which the bevel gear is arranged for transmitting a portion of the drive power to the vehicle axle. The second part shaft may, in contrast, have said second end of the drive shaft. Furthermore, at least a portion of the drive power may in this respect be transmitted to a further drivable vehicle axle via the second end, wherein the longitudinal differential may in particular serve to transmit the same torque to both drivable vehicle axles. The output elements may in particular be formed by respective side gears of the longitudinal differential.

The brake section of the drive shaft may be formed by the input element, in particular a differential cage, of the longitudinal differential. Due to the brake disk arranged at the brake section, the input element and in particular the differential cage of the longitudinal differential may consequently be directly fixedly held in order to prevent a rotation of the vehicle axle and thus a rolling away of the vehicle, for example during a loading.

Furthermore, provision may be made that the brake section is formed by one of the output elements or is brake-effectively and/or rotationally fixedly connected to one of the output elements. For example, the output elements may be formed by respective side gears of the longitudinal differential, wherein at least one of the side gears may be fixedly held by the brake to prevent a rolling away of the vehicle when stationary. In particular, the brake section may in this respect be arranged at the second part shaft and the brake disk may be brake-effectively connected to the second part shaft in order to block a rotation of the second part shaft. Furthermore, a portion of the drive power may be transmittable to a further drivable vehicle axle via the second part shaft or the second end of the drive shaft, wherein the brake disk may, for example, also be arranged in the region of the further vehicle axle in such embodiments.

In some embodiments, the longitudinal differential may be arranged between the first end of the drive shaft and the brake disk with respect to the longitudinal direction of the vehicle. The longitudinal differential may in this respect in particular be arranged within said housing. The axle drive may thus be designed as a compact unit which is surrounded by the housing and from which only the drive shaft and in particular its brake section may extend to be able to arrange the brake disk outside the housing. Furthermore, provision may be made that the bevel gear projects from the housing to transmit the drive power to the vehicle axle.

The invention will be explained in the following purely by way of example with reference to embodiments and to the drawings.

Figure 2A:
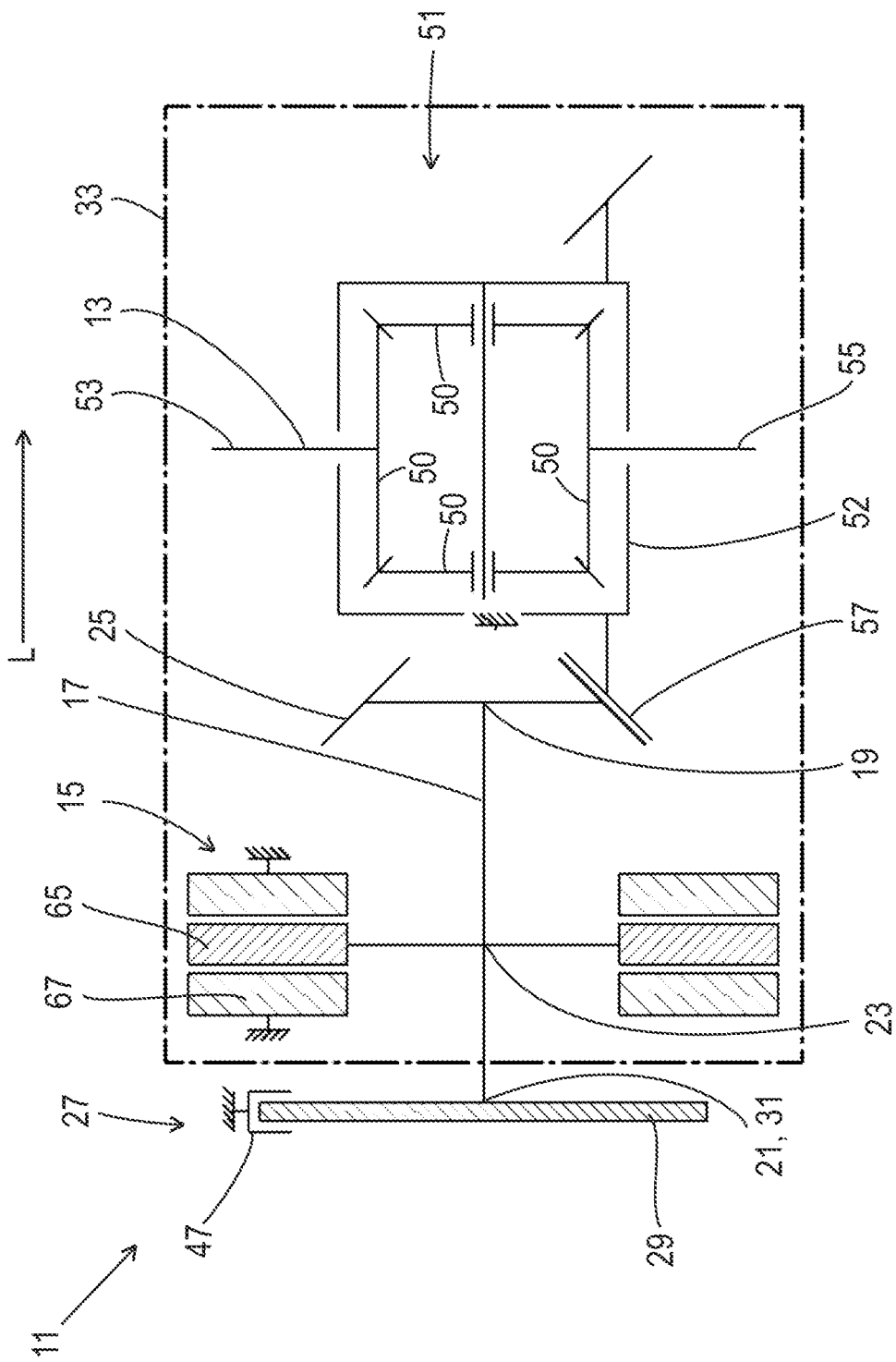
Figure 2B:
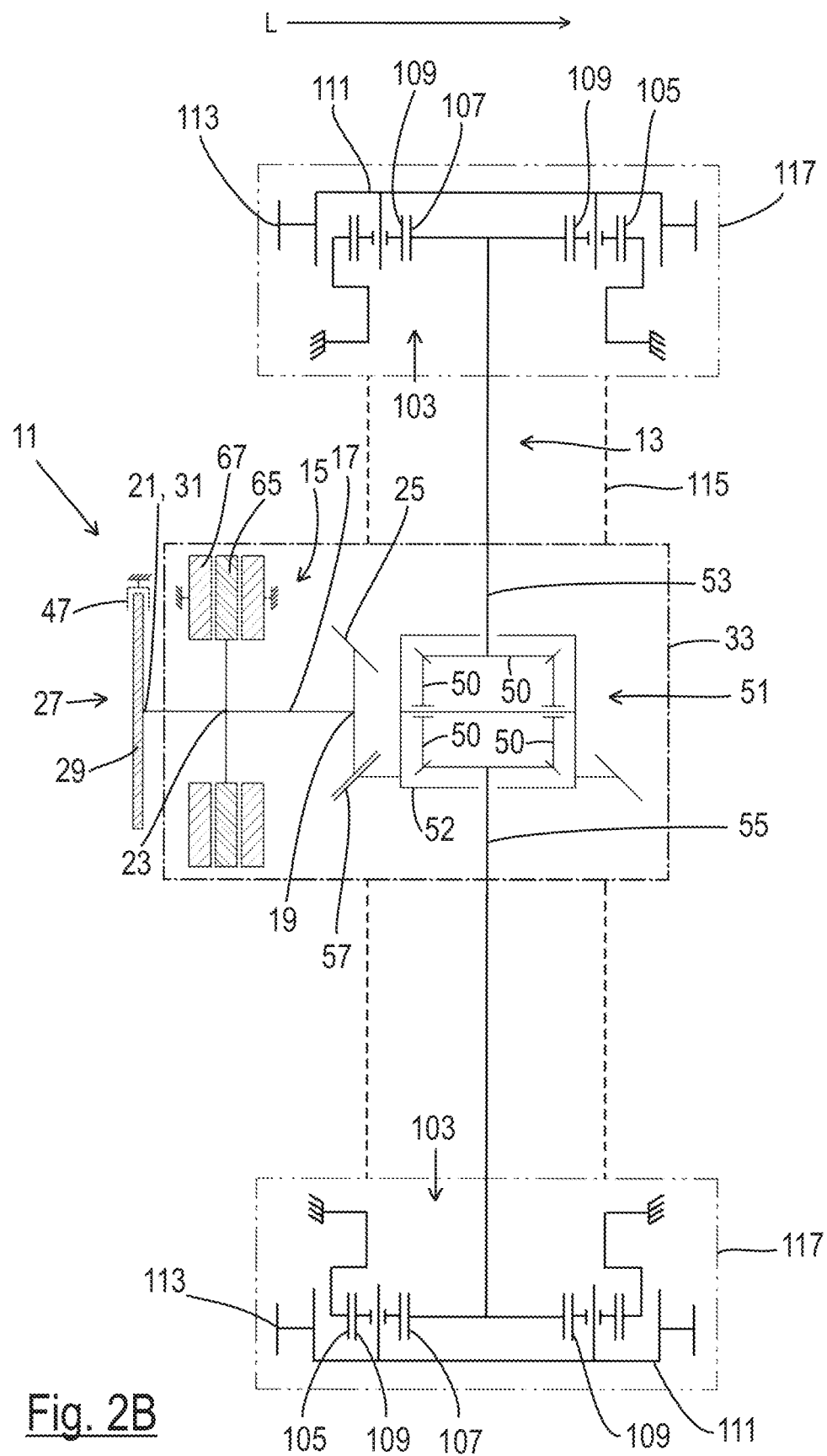
Figure 3A:
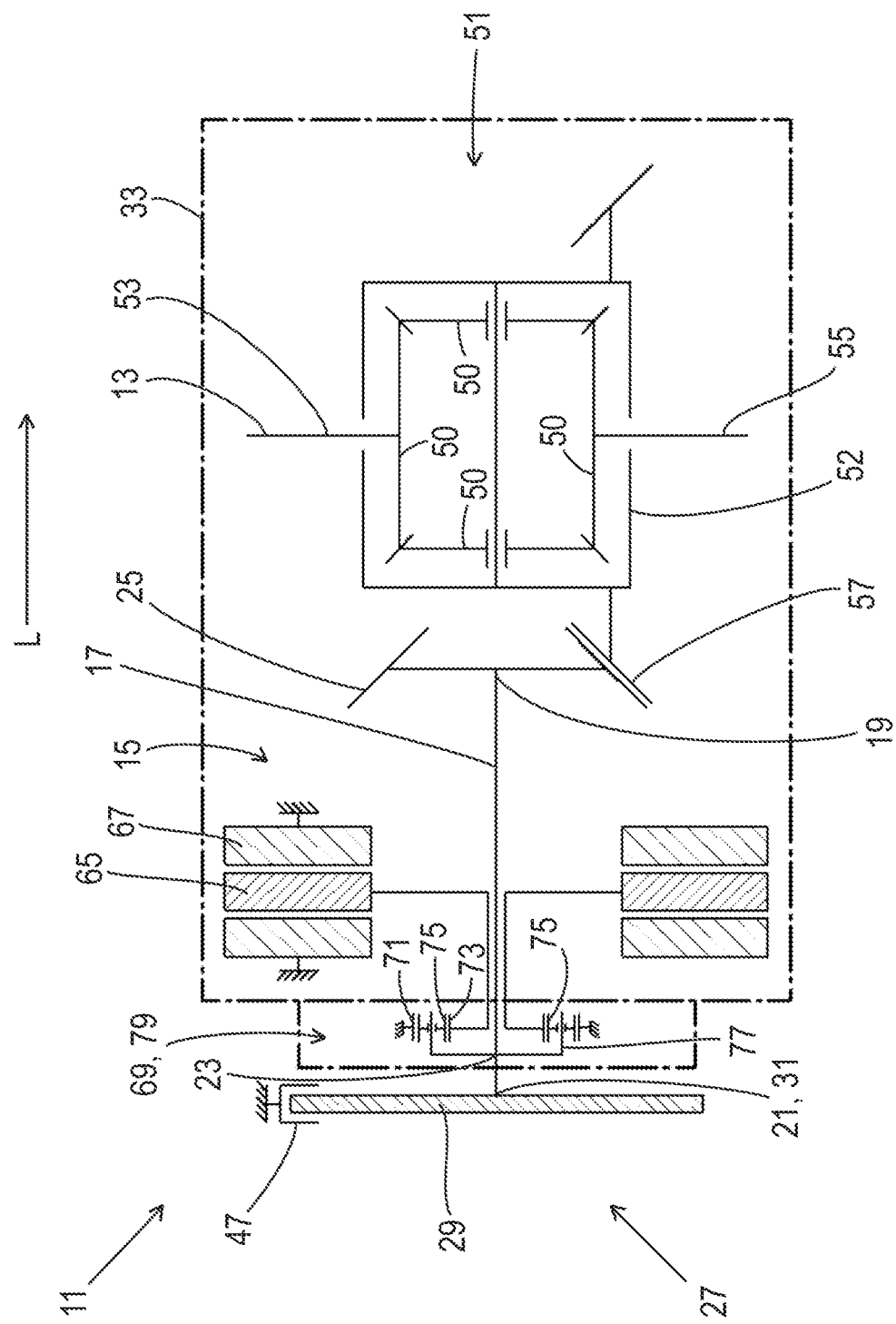
Figure 3B:
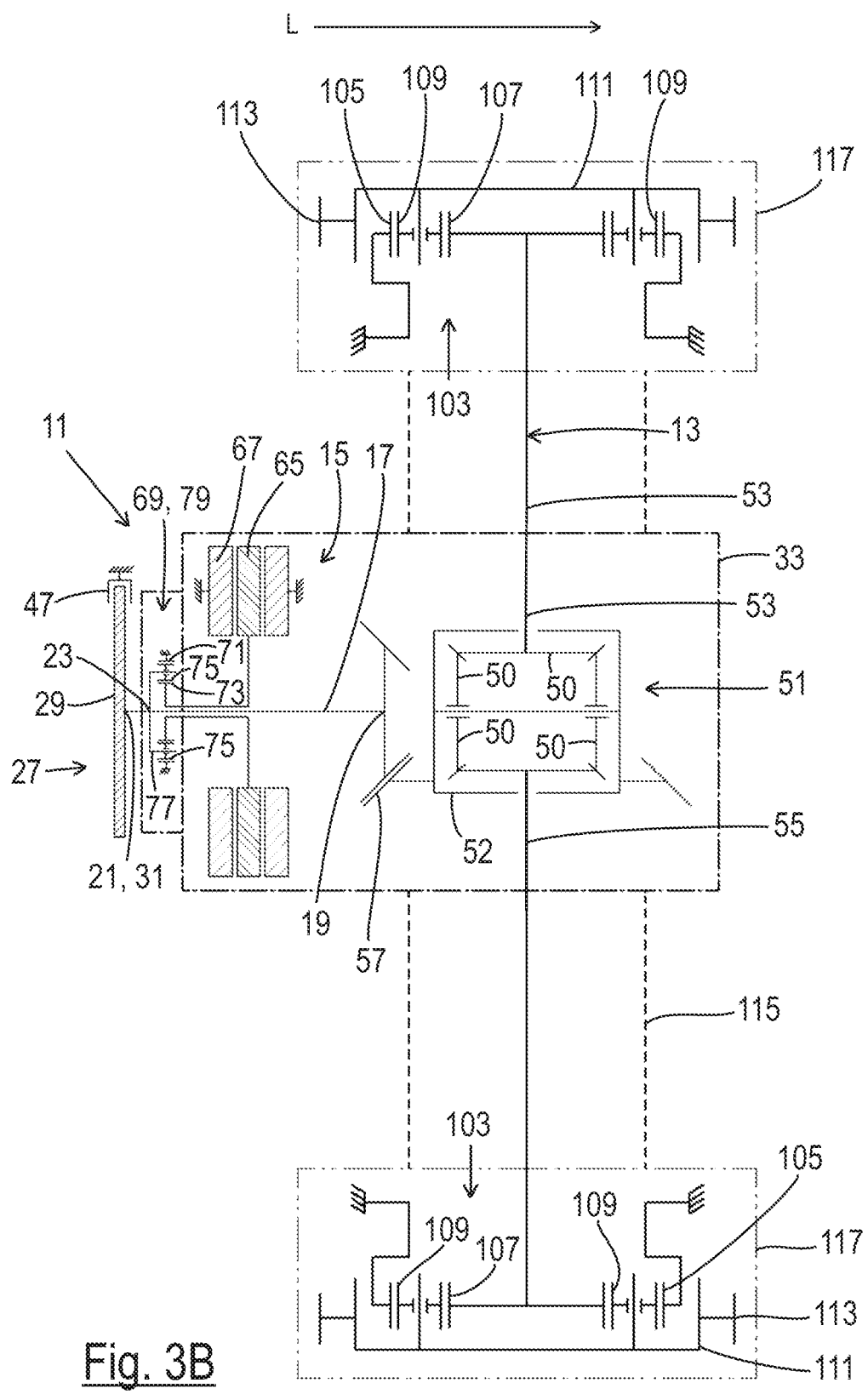
Figure 4A:
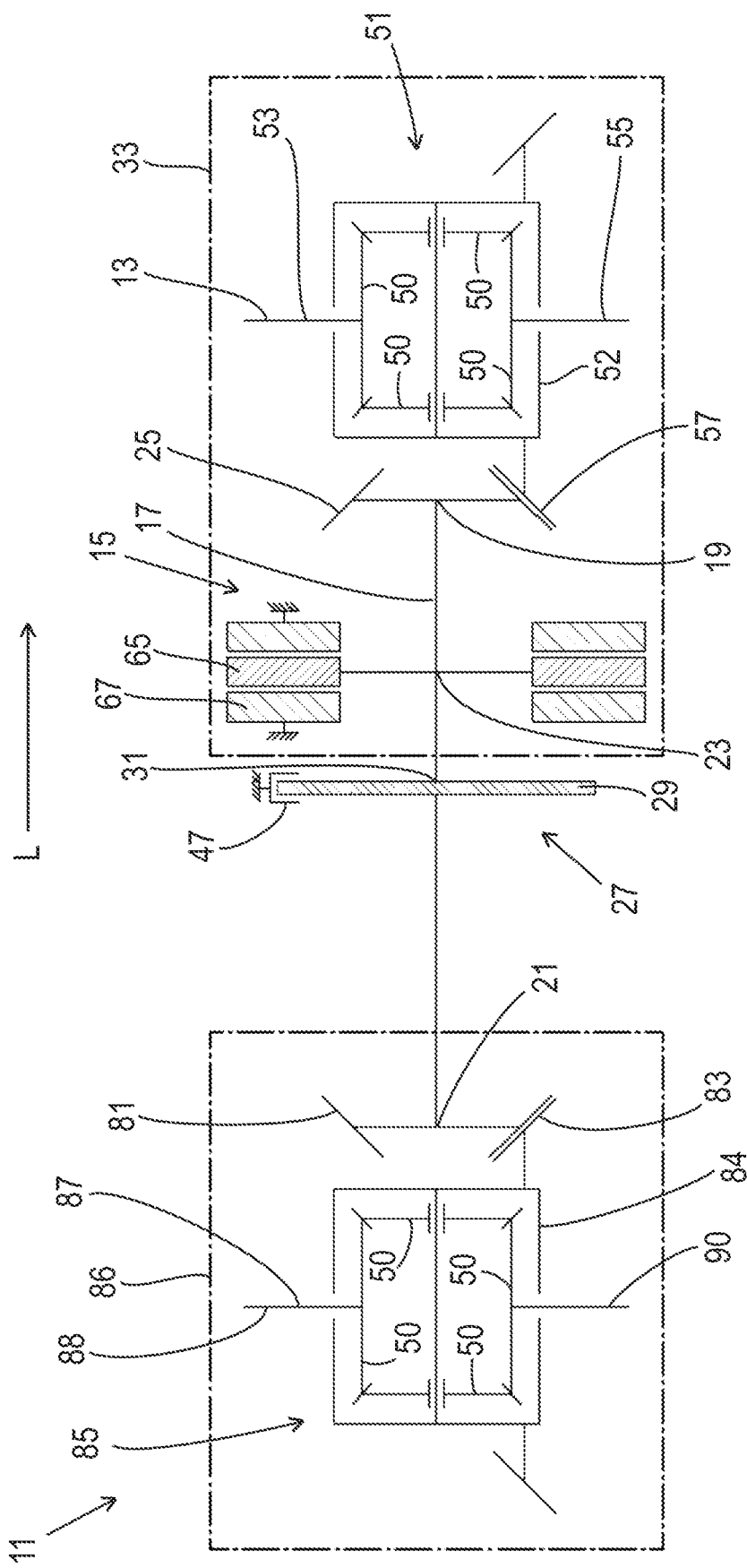
Figure 4B:
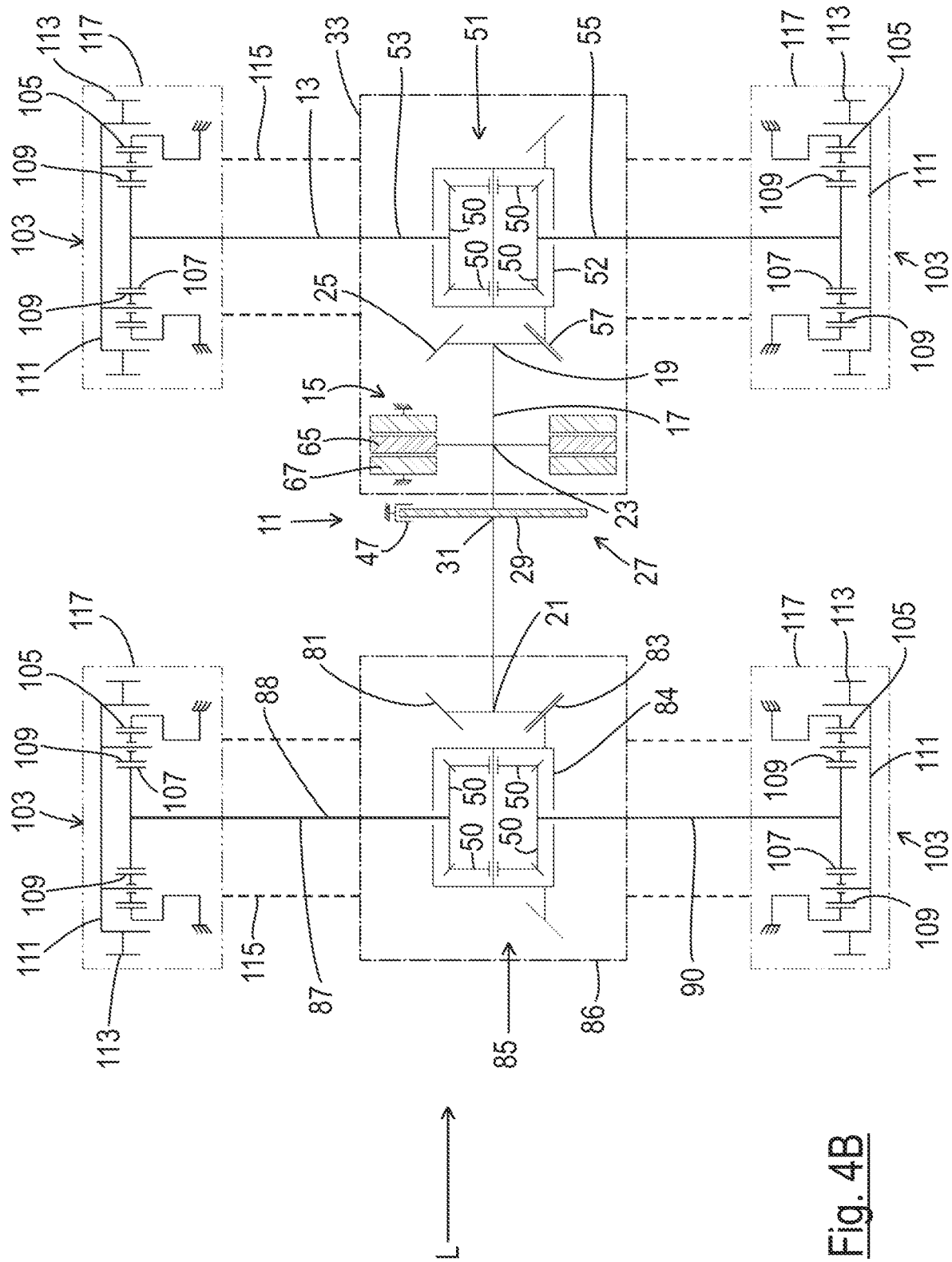
Figure 5A:
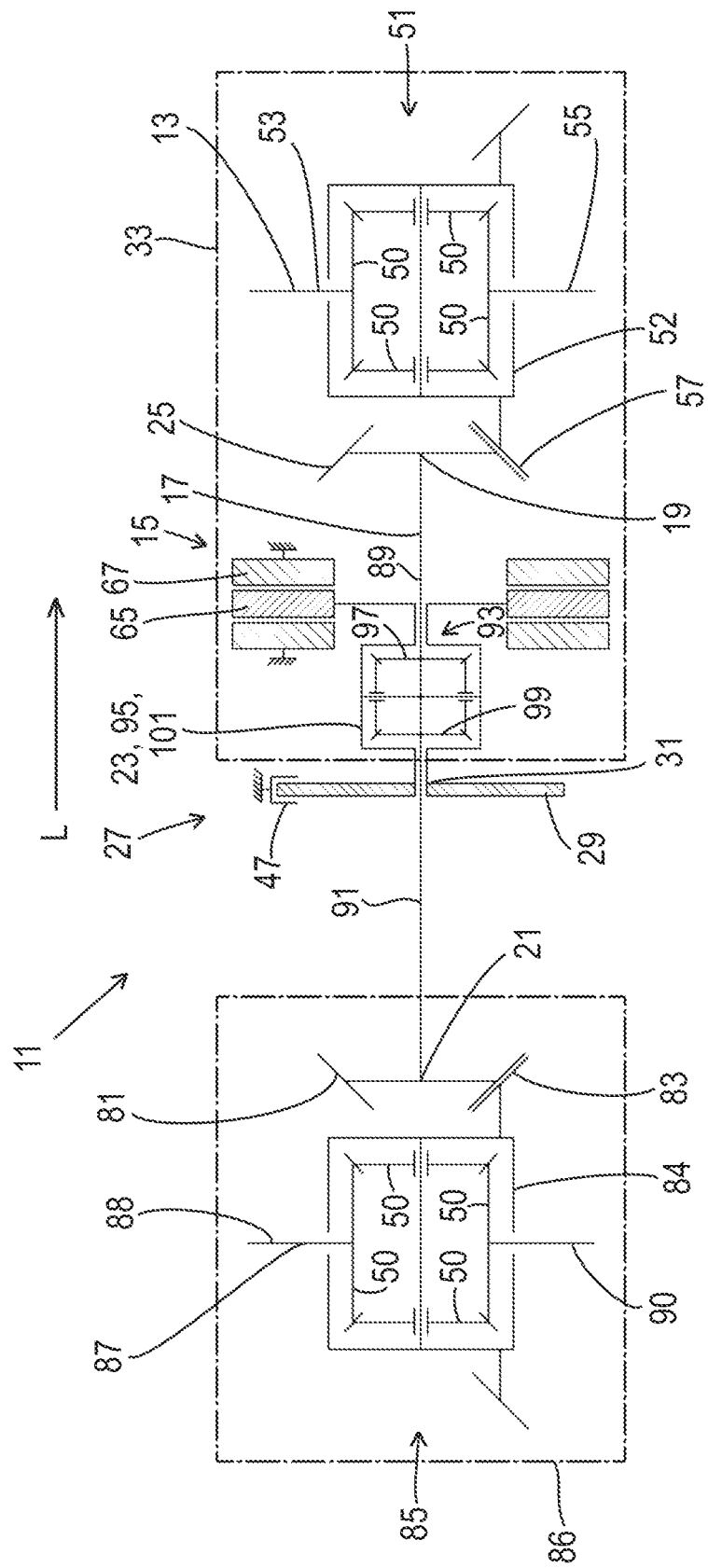
Figure 5B:
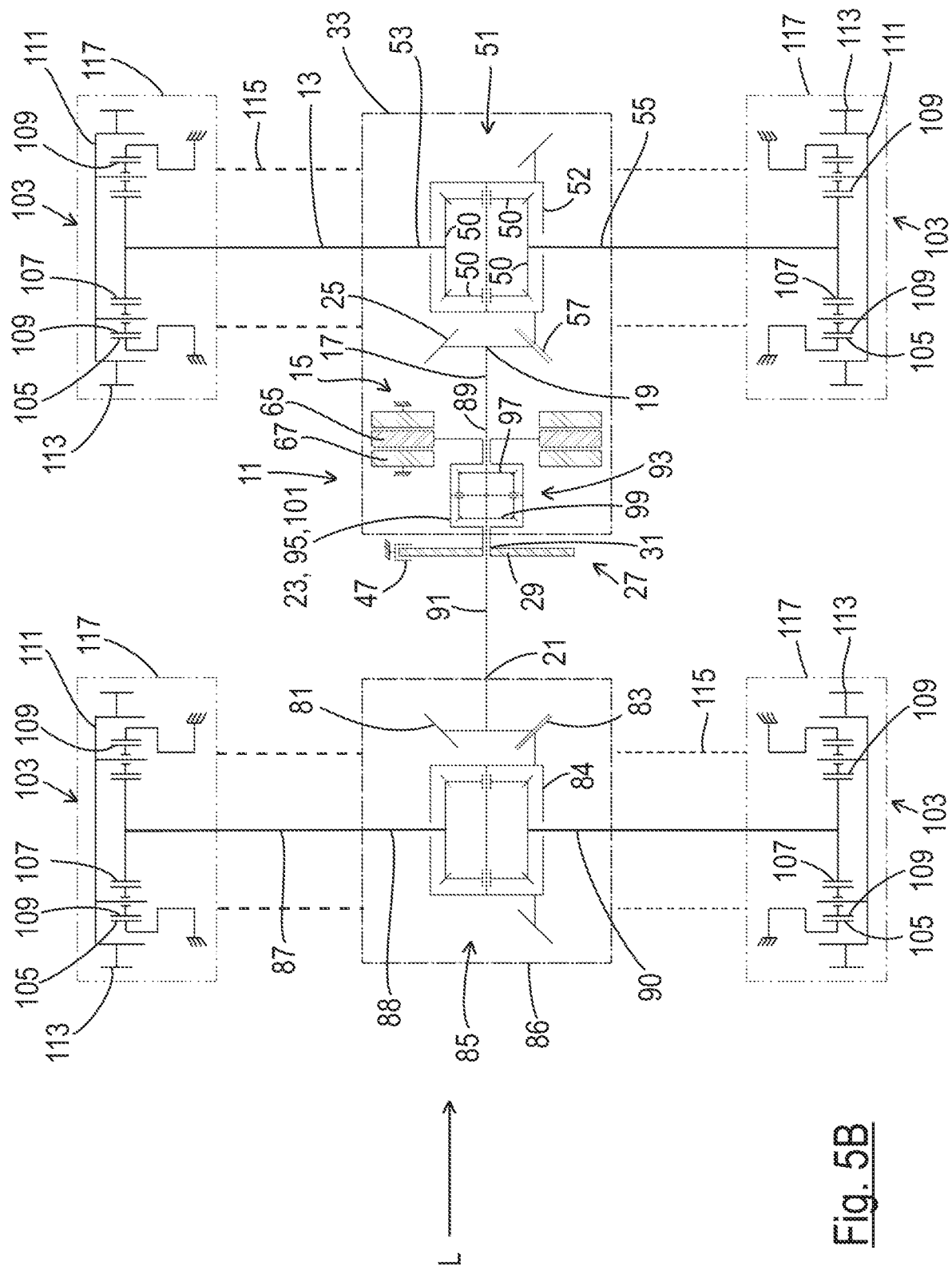

There are shown:

FIG. 1 a representation of an axle drive with a brake;

FIGS. 2A and 2B a schematic representation of an embodiment of the axle drive and a schematic representation of such an axle drive in connection with a vehicle axle driven by the axle drive;

FIGS. 3A and 3B a schematic representation of a further embodiment of the axle drive and a schematic representation of such an axle drive in connection with a vehicle axle driven by the axle drive;

FIGS. 4A and 4B a schematic representation of a further embodiment of the axle drive for driving two vehicle axles and a schematic representation of such an axle drive in connection with two vehicle axles driven by the axle drive; and FIGS. 5A and 5B a schematic representation of a further embodiment of the axle drive for driving two vehicle axles and a schematic representation of such an axle drive in conjunction with two vehicle axles driven by the axle drive.

FIG. 1 shows an axle drive 11 for driving a vehicle axle 13 that is oriented transversely or at least substantially perpendicular to a longitudinal direction L of a vehicle, not shown. The axle drive 11 comprises an electric motor 15 and a drive shaft 17 that extends along the longitudinal direction L of the vehicle and that is configured to receive drive power generated by the electric motor 15 at an input section 23 and to transmit said drive power to the vehicle axle 13 via a bevel gear 25 arranged at a first end 19 of the drive shaft 17. For this purpose, the input section 23 is rotationally fixedly connected to a rotor 65 of the electric motor 15 that is rotatable relative to a stator 67 of the electric motor 15. Consequently, the input section 23 or the drive shaft 17 rotates at the rotational speed of rotor 67 in operation.

In this respect, the electric motor 15 is arranged coaxially to the drive shaft 17 and surrounds the input section 23, with the drive shaft 17 extending through the electric motor 15 towards a second end 21. In the embodiment example of FIG. 1, the electric motor 15 is designed as an axial flux motor and has a correspondingly small extent along the longitudinal direction L. The electric motor 15 may, however, generally be formed with a rotor 65 and a stator 67, depending on the application and in any desired manner. Therefore, electric motors 15 not configured as axial flux motors may also be provided for generating the drive power.

To transmit the drive power generated by the electric motor 15 to the vehicle axle 13, the bevel gear 25 meshes with a ring gear 57. This ring gear 57 may be rotationally fixedly coupled to a differential 51, in particular a differential cage 52, wherein drive power conducted to the vehicle axle 13 by means of such a differential 51 may be proportionally transmitted to two respective half-shafts 53 and 55 of the vehicle axle 13 (cf. FIGS. 2A to 5B). This may in particular make it possible to set wheels arranged at respective wheel sides 117 of the vehicle axle 13 into rotation as required in order, for example, to enable a faster rotation of a wheel rotating at the outside on the driving through of a bend. Alternatively thereto, the ring gear 57 may also be rotationally fixedly connected to a respective one of the half-shafts 53 and 55, wherein a further axle drive 11 may be provided to drive the respective other half-shaft 53 or 55. In this respect, different rotational speeds may also be achieved at the wheel sides 117 of the half-shafts 53 and 55 through an individual control of the electric motors 15.

The drive shaft 17 is, at least partly, arranged in a housing 33 of the axle drive 11. This housing 33 has an integrally single-part bearing section 35 to which the stator 67 of the electric motor 15 is rotationally fixedly connected and at which bearings 37, which may in particular be configured as rolling element bearings, are supported for supporting the drive shaft 17. All of the bearings 37 are in particular supported at the bearing section 35 in the embodiment of the axle drive 11 illustrated in FIG. 1. Since the bearings 37 are supported at an integrally single-part bearing section 35, the bearings 37 may be arranged exactly in alignment with one another to ensure a precise alignment of the drive shaft 17 in parallel with the longitudinal direction L of the vehicle on the use of fast-rotating electric motors 15.

The bearing section 35 further has an installation opening 39 at an outer side 49 facing the second end 21 of the drive shaft 17, through which installation opening 39 the electric motor 15 may be inserted into the housing 33 in an axial manner with respect to the drive shaft 17 during an installation. Opposite the installation opening 39 a drive transmission opening 41 is formed at the bearing section 35, through which drive transmission opening 41 the bevel gear 25 extends into a section of the housing 33 which acts as a differential housing 59 and in which the ring gear 57 is arranged. Accordingly, the first end 19 of the drive shaft 17 projects from the bearing section 35 or from the housing 33.

In addition to the possibility of conducting drive power from the axle drive 11 to the vehicle axle 13, the drive transmission opening 41 also serves to insert the drive shaft 17 axially into the housing 33 and to connect said drive shaft 17 to the electric motor 15 inserted through the installation opening 39. The drive shaft 17 may thereby in particular also be formed in one part with the bevel gear 25 whose maximum diameter exceeds the diameter of the drive transmission opening 41. However, it is also possible for the bevel gear 25 to be formed separately from the drive shaft 17 and to be connected to the first end 19 of the drive shaft 17, which projects from the drive transmission opening 41, before or after the insertion of said drive shaft 17 into the housing 33.

However, provision may generally also be made to insert the drive shaft 17 into the housing 33 through the installation opening 39 and thereupon to connect the bevel gear 25 to the first end 19 of the drive shaft 17 if the bevel gear 25 and the drive shaft 17 are formed as separate components.

Since the bevel gear 25 projects into the differential housing 59 through the drive transmission opening 41, the region of the bearing section 35 at which the bearings 37 are supported and the differential housing 59 form a common lubricant chamber 61 such that lubricant and heat may be exchanged between the bearing section 35 and the differential housing 59. Waste heat generated by the drive shaft 17 may thereby in particular be radiated over as large a radiation surface as possible to be able to prevent an overheating of the axle drive 11 on the use of compact and fast-rotating electric motors 15 that may consequently also set the driven shaft 17 into a fast rotation. In this respect, the electric motor 15 is sealed with respect to the common lubricant chamber 61 by seals 63.

The housing 33 further has a cover 43 by which the installation opening 39 of the bearing section 35 is closed. The housing 33 thus surrounds the electric motor 15 inserted as well as the bearings 37 and the input section 23 of the drive shaft 17 that accordingly form a compact unit reliably protected from damage by the housing 33. In this respect, the electric motor 15 is integrated into the axle drive 11 or is encompassed by the axle drive 11 and is not, as in common solutions, flanged to an axle drive as a module to be understood separately.

The cover 43 also has an opening 45 which is arranged in alignment with the installation opening 39 and through which the drive shaft 17 extends from the housing 33 toward its second end 21. The part of the drive shaft 17 extending outside the housing 33 towards the second end 21 in this respect forms a brake section 31 at which a brake disk 29 of a brake 27, which is brake-effectively connected to the brake section 31, is arranged directly or via a holder. This brake 27 further has a brake caliper 47 that is arranged and floatingly supported at the outer side 49 of the housing 33 or at the cover 43. The brake caliper 47 in this respect engages around the brake disk 29 to be able to reliably prevent a rotation of the drive shaft 17, which is brake-effectively coupled to the brake disk 29, and thus of the vehicle axle 13 during a standstill of the vehicle. Furthermore, the brake caliper 47 is arranged such that the brake caliper 47 is arranged vertically above the brake disk 29 in the installed state of the axle drive 11 or in the state of the axle drive 11 connected to the vehicle axle 13. Here, the brake caliper 47 is attached perpendicular above the drive shaft 17 in the installed state of the axle drive 11, wherein any desired arrangements of the brake caliper 47 around the brake disk 29 are generally possible. In this respect, such arrangements in which the brake disk 29 may be removed downwardly or from below may facilitate service or repair work, such as the replacement of a worn brake disk 29, when the axle drive 11 is installed.

The brake 27 in this respect acts as a parking brake and is provided to reliably secure the vehicle against rolling away when stationary by an engagement of the brake caliper 47 into the brake disk 29. In addition, the brake 27 also serves to provide an emergency braking function. For this purpose, the brake caliper 47 may be actively brought out of engagement with the brake disk 29 during the travel, wherein it is configured to automatically come into engagement with the brake disk 29 and to brake the vehicle on a failure or a disturbance of the pressure required for this purpose.

Since the brake disk 29 is arranged completely outside the housing 33, the brake 27 is accessible in a simple manner from the outside, for example for service work, without the housing 33 having to be opened or disassembled for this purpose. A brake disk 29 to be replaced may thereby in particular, for example, be replaced with a new brake disk 29 without problem and quickly. Due to the arrangement of the brake caliper 47 vertically above the brake disk 29 with the axle drive 11 installed or connected to the vehicle axle 13, it is furthermore possible to downwardly remove the brake disk 29 from the brake section 31 from a lower side of the vehicle in a radial manner with respect to the drive shaft 17.

Due to the arrangement outside the housing 33 and due to the sealing by means of the seals 63 with respect to the lubricant chamber 61, the brake 27 may furthermore be designed as a dry brake such that the brake disk 29 may rotate completely dry. The axle drive 11 may thereby be equipped with a reliable, compact, and inexpensive brake 27 that may in particular also prove to be low-maintenance and low-wear. A high degree of efficiency may also be achieved by means of the brake 27 having a dry rotating brake disk 29, in particular in comparison with wet-running multi-disk parking brakes.

The axle drive 11 is consequently configured such that, with respect to the longitudinal direction L of the vehicle, the input section 23 of the drive shaft 17 is arranged between the brake disk 29 and the first end 19 of the drive shaft 17 to which the bevel gear 25 is connected for transmitting the drive power to the vehicle axle 13. The electric motor 15 is accordingly also arranged between the brake disk 29 and the bevel gear 25. Unlike with conventional axle drives in which the electric motor 15 may, for example, be flanged to a housing to transmit drive power, the electric motor 15 is here integrated directly into the axle drive 11 and the drive shaft 17 so-to-say extends through the electric motor 15.

Due to this leading of the drive shaft 17 through the electric motor 15, the brake disk 29 may be arranged outside the housing 33 and, viewed from the first end 19 of the drive shaft 17 along the longitudinal direction L, behind the electric motor 15 such that the electric motor 15 and the brake disk 29 may, coaxially to the drive shaft 17, together be arranged at one side of the vehicle axle 13. A very compact design of the axle drive 11 may thereby be achieved and the total axle drive 11, apart from an extent of the ring gear 57 projecting radially beyond the vehicle axle 13, may be arranged at a side of the vehicle axle 13. The other side of the vehicle axle 13 may thus remain completely free of components of the axle drive 11 such that a possibly required free space or otherwise occupied installation space is not impaired by the axle drive 11 and in particular its design with the brake 27.

Provision may, for example, be made to arrange the axle drive 11 in front of a front axle or behind a rear axle in order to keep the space between the vehicle axles completely free of components of the axle drive 11. Provision may also be made to arrange the axle drive 11 completely between two vehicle axles 13 and 87 in order, for example, to also be able to drive a further vehicle axle 87 by means of the electric motor 15 or to be able to keep the space in front of a front axle or behind a rear axle free (cf. also FIGS. 4A to 5B). The compact design of the axle drive 11 consequently enables a flexible connection to the vehicle axle 13 that meets the demands. Furthermore, a reliable brake 27 for blocking the vehicle axle 13 when the vehicle is stationary may be provided by the axle drive 11 without the design with the brake 27 being accompanied by an unreasonable increase in the extension of the axle drive 11 or by the necessity of an arrangement of the axle drive 11 at the vehicle axle 13, said arrangement restricting a possibly necessary free space.

In the embodiment example of FIG. 1, the brake section 31 is provided at the second end 21 of the drive shaft 17 such that the axle drive 11 forms a compact module for driving the vehicle axle 13. Alternatively thereto, the drive shaft 17 may, however, also be configured in the form of a through drive shaft and may extend beyond the brake disk 29 in order, for example, to be able to drive a further vehicle axle 87 (cf. FIGS. 4A to 5B). Accordingly, the brake section 31 may also be provided between the first end 19 and the second end 21 of the drive shaft 17 with respect to the longitudinal direction L of the vehicle.

FIGS. 2A and 2B schematically illustrate a first embodiment of the axle drive 11 that substantially corresponds to the axle drive 11 shown in FIG. 1. The axle drive 11 thus has an electric motor 15 having a rotor 65 and a stator 67, wherein the rotor 65 is rotationally fixedly connected to an input section 23 of a drive shaft 17 that extends in parallel with a longitudinal direction L of the vehicle and that has a bevel gear 25 at a first end 19 to be able to transmit drive power to a vehicle axle 13. The electric motor 15 is in this respect arranged coaxially to the drive shaft 17 and is arranged around its input section 31.

At a second end 21 opposite the first end 19, the drive shaft 17 forms a brake section 31 that is brake-effectively coupled to a brake disk 29 of a brake 27. In this respect, the second end 21 of the drive shaft 17 extends from a housing 33 of the axle drive 11 such that the brake disk 29 rotates dry. To be able to reliably block a rotation of the drive shaft 17, the brake 27 further has a brake caliper 47 that engages around the brake disk 29 and that is likewise arranged outside the housing 33. The input section 23 of the drive shaft 17 is thus arranged between the brake section 31 and the first end 19 of the drive shaft 17 with respect to the longitudinal direction L; accordingly, the electric motor 15 is arranged between the brake disk 29 and the bevel gear 25.

As FIG. 2A illustrates, the bevel gear 25 meshes with a ring gear 57 that is rotationally fixedly connected to a differential cage 52 of a differential 51 and that may, for example, be formed in one part with the differential cage 52. In this respect, the differential 51 has a plurality of balancing gears 50, wherein two of the balancing gears 50 are connected to a respective half-shaft 53 or 55 of the vehicle axle 13. Due to the transmission of the drive power to the differential 51, the drive power received from the bevel gear 25 may be proportionally distributed to the half-shafts 53 and 55 in order, for example, to enable a faster rotation of a wheel rotating at the outside on the driving through of a bend.

As FIG. 2B illustrates, for the installation of the axle drive 11, the housing 33 may be connected to an axle chamber housing 115 in which the half-shafts 53 and 55 of the vehicle axle 13 extend toward respective wheel sides 117. In this respect, the axle drive 11 may be preassembled as a compact module and may be connected to the axle chamber housing 115 in the course of the installation.

In order in particular to be able to apply the necessary torques for driving the vehicle on the use of a fast-rotating electric motor 15, the vehicle axle 13 is configured as an outer planetary axle and has a respective planetary gear set 103 at the wheel sides 117. The planetary gear sets 103 in this respect act as respective reduction gear units to transmit a rotation of the half-shafts 53 or 55 reduced or slowed down to wheels or wheel hubs 113 arranged at the wheel sides 117. For this purpose, the respective half-axle 53 or 55 is connected to a sun gear 107 of the planetary gear set 103, wherein the planetary gear set 103 further has a fixedly held ring gear 105 and a plurality of planet gears 109. The ring gear 105 is arranged concentrically to the sun gear 107 and, as a result of a rotation of the sun gear 107 or of the respective half-shaft 53 or 55, the planet gears 109 rotate around axles that are arranged on a web 111 rotating around the sun gear 107. The web 111 is in this respect connected to a respective wheel hub 113 for fastening the wheel such that the wheel rotates at the rotational speed of the web 111 that is slowed down, i.e. reduced, in comparison with the respective half-shaft 53 or 55 or the respective sun gear 107.

In the embodiment of the axle drive 11 illustrated in FIGS. 3A and 3B, the electric motor 15 further has, in addition to the rotor 65 and the stator 67, a transmission 69 via which the rotor 65 is connected to the input section 23 of the drive shaft 17. Drive power received from the electric motor 15 is consequently transmitted via the transmission 69 to the input section 23 of the drive shaft 17. In this respect, the transmission 69 is likewise configured as a planetary gear set comprising a fixedly held ring gear 71 and the rotor 65 of the electric motor 15 is rotationally fixedly connected to a sun gear 73 of the transmission 69. The input section 23 of the drive shaft 17 is, in contrast, connected to a web 77 at which, as a result of a rotation of the sun gear 73 together with the web 77, axles of a plurality of planet gears 75 rotatable around the sun gear 73 are arranged.

Due to the transmission 69, a rotation of the rotor 65 is consequently transmitted slowed down to the input section 23 of the drive shaft 17 connected to the web 77 such that the transmission 69 forms a transmission stage 79 for slowing down the rotation. A rotation of the drive shaft 17 slowed down in comparison with the rotor 65 may thereby in particular be achieved on the use of a fast-rotating electric motor 15 in order, for example, to be able to reduce the waste heat generated as a result of the rotation of the drive shaft 17.

Provision may generally also be made to design the axle drive 11 with a transmission 69 that enables a shifting between different transmission stages such that the drive shaft 17 may, for example, be selectively couplable to the web 77 or to the sun gear 73. Provision may also be made to be able to selectively connect the rotor 65 to the sun gear 73 or the web 77. Such a transmission 69 may provide speeds for the axle drive 11, wherein, on a coupling of the drive shaft 17 to the web 77, as shown in FIGS. 3A and 3B, a speed reduction of the rotational speed of the rotor 65 takes place and the drive shaft 17 rotates slowed down, whereas the rotational speed of the rotor 65 is transmitted unchanged to the drive shaft 17 on a coupling of the drive shaft 17 to the sun gear 73. Furthermore, the transmission 69 may also be configured in another manner, for example, as a planetary gear set comprising a fixedly held web 77 or a fixedly held sun gear 73 or as another transmission.

As FIG. 3B shows, such an axle drive 11 may also be connected to a transmission 69 comprising an axle chamber housing 115, wherein the half-shafts 53 and 55 may again be set into rotation as required by means of a differential 51. The vehicle axle 13 is in this respect also configured as an outer planetary axle comprising a respective planetary gear set 103 provided at the wheel sides 117. However, in the embodiments of the axle drive 11 shown, it is generally not necessary for the vehicle axle 13 or a further vehicle axle 87 to be configured as an outer planetary axle.

FIGS. 4A and 4B show a further embodiment of the axle drive 11, wherein the brake disk 29 is not arranged at the second end 21 of the drive shaft 17 in this embodiment. The drive shaft 17 rather extends beyond the brake section 31 or the brake disk 29 in this embodiment such that the brake section 31 is arranged between the first end 19 of the drive shaft 17 and its second end 21. The drive shaft 17 may in this respect in particular be formed in one part or have a plurality of part shafts, in particular two part shafts, that are each connected to the brake disk 29.

At the second end 21, a further bevel gear 81 is arranged here that meshes with a further ring gear 83. The further ring gear 83 is in this respect rotationally fixedly connected to a differential cage 84 of a further differential 85 and may, for example, be formed in one part with the differential cage 84. Drive power generated by the electric motor 15 may hereby be proportionally transmitted to a further vehicle axle 87, wherein respective half-shafts 88 and 90 of the further vehicle axle 87 are rotationally fixedly connected to a respective balancing gear 50 of the further differential 85. Drive power transmitted to the further vehicle axle 87 may thereby also be split between the half-shafts 88 and 90 as required.

The further differential 85 is in this respect arranged in a further differential housing 86 that, as FIG. 4B shows, may be connected to an axle chamber housing 115 for the further vehicle axle 87 in order to install the axle drive 11. Both vehicle axles 13 and 87 are in this respect again configured as outer planetary axles comprising respective planetary gear sets 103 arranged at wheel sides 117.

As can be seen from FIG. 4B, the axle drive 11 is in this respect arranged completely between the vehicle axles 13 and 87 without the axle drive 11 extending beyond one of the vehicle axles 13 and 87. This enables a very compact and space-saving arrangement of the axle drive 11 that enables a driving of both vehicle axles 13 and 87 by means of the electric motor 15 and a firm holding of the vehicle by means of the brake 27 without a space in front of a front axle or behind a rear axle being taken up by the axle drive 11.

FIGS. 5A and 5B also show an embodiment of the axle drive 11 in which the drive shaft 17 extends beyond the brake section 31 to drive a further vehicle axle 87 via a further bevel gear 81, a further ring gear 83, and a further differential 85. In comparison with the embodiment of FIGS. 4A and 4B, the drive shaft 17 further has a first part shaft 89 and a second part shaft 91 coaxial thereto as well as a longitudinal differential 93 arranged therebetween. In this respect, the first end 19 of the drive shaft 17 is provided at the first part shaft 89, while the second end 21 is arranged at the second part shaft 91.

The input section 23 of the drive shaft 17 is here formed by an input element 95 of the longitudinal differential 93 that corresponds to a differential cage 101 of the longitudinal differential 93. At the same time, the input element 95, in particular a hollow-shaft-like prolongation of the input element 95 that is rotationally fixedly connected to the differential cage 101 and is led outwardly from the housing 33, forms the brake section 31 at which the brake disk 29 is arranged such that the brake disk 29 is brake-effectively coupled to the differential cage 101 of the longitudinal differential 93 to fixedly hold the latter on a blocking of the brake disk 29 by the brake caliper 47.

The design of the axle drive 11 with the longitudinal differential 93 makes it possible to distribute drive power received at the input section 23 to the first part shaft 89 and the second part shaft 91 of the drive shaft 17 via respective output elements 97 and 99. In this respect, the output elements 97 and 99 correspond to respective side gears of the longitudinal differential 93 such that it may be achieved by the longitudinal differential 93 that an equal torque is provided at the vehicle axles 13 and 87.

FIG. 5B again shows the installation of the axle drive 11 for connection to respective axle chamber housings 115 of the vehicle axles 13 and 87. In this respect, the longitudinal differential 93 may be arranged within a housing 33 such that the axle drive 11 comprising the longitudinal differential 93 may, for example, be connected as a preassembled unit to the axle chamber housing 115. In embodiments of the axle drive 11 in which drive power generated by the electric motor 15 is at least proportionally transmitted to a further vehicle axle 87, an electric motor 15 may generally also be provided that has a transmission 69, similarly to as shown in FIGS. 3A and 3B.

Due to the high integration of the electric motor 15 and the arrangement of the brake disk 29, the axle drive 11 thus enables a very compact design to be able to be used flexibly and as required for driving at least one vehicle axle 13. The design with the brake 27 furthermore makes it possible to reliably secure a stationary vehicle against rolling away such that the axle drive 11 may in particular be used in commercial vehicles that are, for example, exposed to high loads during a loading and that require a secure firm holding.

REFERENCE NUMERAL LIST

11 axle drive
13 vehicle axle
15 electric motor
17 drive shaft
19 first end of the drive shaft
21 second end of the drive shaft
23 input section
25 bevel gear
27 brake
29 brake disk
31 brake section
33 housing
35 bearing section
37 bearing
39 installation opening
41 drive transmission opening
43 cover
45 opening of the cover
47 brake caliper
49 outer side of the housing
50 balancing gear
51 differential
52 differential cage
53 first half-shaft
55 second half-shaft
57 ring gear
59 differential housing
61 common lubricant chamber
63 seal
65 rotor
67 stator
69 transmission
71 ring gear
73 sun gear
75 planet gear
77 web
79 transmission stage
81 further bevel gear
83 further ring gear
84 differential cage
85 further differential
86 further differential housing
87 further vehicle axle
88 first half-shaft of the further vehicle axle
89 first part shaft of the drive shaft
90 second half-shaft of the further vehicle axle
91 second part shaft of the drive shaft
93 longitudinal differential
95 input element
97 first output element
99 second output element
101 differential cage of the longitudinal differential
103 planetary gear set
105 ring gear
107 sun gear
109 planet gear
111 web
113 wheel hub
115 axle housing
117 wheel side
L longitudinal direction

The invention claimed is:

1. An axle drive for a vehicle, the vehicle comprising at least one drivable vehicle axle oriented transversely to a longitudinal direction of the vehicle,
said axle drive comprising
an electric motor;
a drive shaft that extends in parallel with the longitudinal direction of the vehicle between a first end and a second end opposite the first end and that is configured to receive drive power from the electric motor at an input section and to output said drive power at least partly to the vehicle axle via a bevel gear arranged at the first end; and
a brake comprising a brake disk that is arranged at a brake section of the drive shaft,
wherein the electric motor is arranged coaxially to the drive shaft; and
wherein the input section of the drive shaft is arranged between the brake disk and the first end with respect to the longitudinal direction of the vehicle.

2. An axle drive in accordance with claim 1,
wherein the electric motor extends around the drive shaft.

3. An axle drive in accordance with claim 1,
wherein the electric motor extends around the input section of the drive shaft.

4. An axle drive in accordance with claim 1,
wherein the axle drive further comprises a housing in which the drive shaft is received, wherein the input section of the drive shaft is arranged within the housing.

5. An axle drive in accordance with claim 4,
wherein the housing has a bearing section which is integrally formed in one part and at which bearings for supporting the drive shaft are supported.

6. An axle drive in accordance with claim 4,
wherein the electric motor is arranged within the housing.

7. An axle drive in accordance with claim 4,
wherein the housing has an installation opening that is formed such that the electric motor can be introduced into the housing in an axial direction with respect to the drive shaft.

8. An axle drive in accordance with claim 7,
wherein the housing comprises a cover for the installation opening.

9. An axle drive in accordance with claim 4,
wherein the brake disk is arranged outside the housing.

10. An axle drive in accordance with claim 4,
wherein the brake comprises a brake caliper that is fastened to an outer side of the housing.

11. An axle drive in accordance with claim 10,
wherein the brake caliper is floatingly supported at the housing.

12. An axle drive in accordance with claim 1,
wherein the axle drive further comprises a differential for distributing at least a respective portion of the drive power to two half-shafts of the vehicle axle, and wherein a ring gear meshing with the bevel gear is rotationally fixedly coupled to the differential.

13. An axle drive in accordance with claim 1,
wherein the electric motor has a rotor that is rotationally fixedly connected to the input section of the drive shaft.

14. An axle drive in accordance with claim 1,
wherein the electric motor has a rotor and a transmission via which the rotor is connected to the input section of the drive shaft to transmit drive power received from the electric motor to the input section of the drive shaft.

15. An axle drive in accordance with claim 14,
wherein the transmission is configured to transmit drive power generated by the electric motor to the input section of the drive shaft via at least one transmission stage.

16. An axle drive in accordance with claim 1,
wherein the drive shaft is configured to output drive power received at the input section at least partly to a further drivable vehicle axle via the second end or via a further bevel gear arranged at the second end.

17. An axle drive in accordance with claim 1,
herein the drive shaft comprises at least a first part shaft and a second part shaft coaxial to the first part shaft, and a longitudinal differential that is arranged between the first part shaft and the second part shaft and that is configured to receive drive power from the electric motor at an input element and to distribute the drive power to the first part shaft and the second part shaft via two output elements.

18. An axle drive in accordance with claim 17,
wherein the braking section of the drive shaft is formed by the input element, in particular a differential cage, of the longitudinal differential.

19. An axle drive in accordance with claim 17,
wherein the longitudinal differential is arranged between the first end of the drive shaft and the brake disk with respect to the longitudinal direction of the vehicle.

* * * * *